(12) United States Patent
Niezrecki

(10) Patent No.: US 10,808,374 B2
(45) Date of Patent: Oct. 20, 2020

(54) FOUNDATION AND DEFLECTION MONITORING DEVICE

(71) Applicant: University of Massachusetts, Boston, MA (US)

(72) Inventor: Christopher Niezrecki, Merrimack, NH (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 16/401,008

(22) Filed: May 1, 2019

(65) Prior Publication Data

US 2019/0338487 A1 Nov. 7, 2019

Related U.S. Application Data

(60) Provisional application No. 62/666,399, filed on May 3, 2018.

(51) Int. Cl.
| | | |
|---|---|---|
| *G01B 21/00* | (2006.01) | |
| *E02D 33/00* | (2006.01) | |
| *G01B 21/10* | (2006.01) | |
| *E02D 27/42* | (2006.01) | |

(52) U.S. Cl.
CPC .......... *E02D 33/00* (2013.01); *E02D 27/425* (2013.01); *G01B 21/10* (2013.01)

(58) Field of Classification Search
CPC ........ E02D 33/00; E02D 27/425; G01B 21/10
USPC .......................................................... 73/786
See application file for complete search history.

(56) References Cited

U.S. PATENT DOCUMENTS

| | | | | |
|---|---|---|---|---|
| 2003/0168574 A1* | 9/2003 | Watanabe | ............... | F16F 15/03 248/638 |
| 2012/0140247 A1* | 6/2012 | Monestere | ........... | G01B 11/272 356/620 |
| 2016/0289958 A1* | 10/2016 | Zohar | ..................... | G01V 1/008 |
| 2017/0037832 A1* | 2/2017 | Friedrich | .............. | F03D 7/0224 |

* cited by examiner

*Primary Examiner* — Max H Noori
(74) *Attorney, Agent, or Firm* — Armis IP Law, LLC

(57) ABSTRACT

A foundation shift detection device includes a foundation portion attached to a foundation to be monitored, a base portion attached to a base adjacent to the foundation and supporting the same, and a rotary indicator attached to the base portion and adapted for rotation responsive to displacement of the foundation relative to the base. The rotary indicator is visible to a casual or walking inspection from a moderate distance, as by a human inspector making a walking inspection of a number of such devices.

21 Claims, 4 Drawing Sheets

FOUNDATION AND DEFLECTION MONITORING DEVICE

RELATED APPLICATIONS

This patent application claims the benefit under 35 U.S.C. § 119(e) of U.S. Provisional Patent App. No. 62/666,399, filed May 3, 2018, entitled "WIND TURBINE FOUNDATION MOTION AND CRACK INDICATOR," incorporated herein by reference in entirety.

BACKGROUND

Foundations and load-bearing structures, although intended to remain fixed, can be subject to shifting and subtle movement from environmental, geological, and construction inefficiencies, degradation, and oversights. Of particular concern are wind turbine towers, for which dynamic forces and high fatigue loading may result in foundation failures and potentially reduce the expected design life.

SUMMARY

A foundation shift detection device includes a foundation portion attached to a foundation to be monitored, a tower base portion attached to a base adjacent to the foundation and supporting the same, and a rotary indicator attached to the tower base portion and adapted for rotation responsive to displacement of the foundation relative to the base. The rotary indicator is visible to a casual or walking inspection from a moderate distance, as by a human inspector making a walking inspection of a number of such devices.

Configurations herein are based, in part, on the observation that load-bearing concrete structures, despite their permanency and immobility, are subject to subtle shifting or settling or vibration, often from environmental forces. Of particular consideration are tower structures, such as for wind turbines, which tend to focus a concentrated force on a relatively small bearing area, and are subject to dynamic loads from the natural variance of the wind they are designed to respond to. Often, such as in fixed building structures, foundation settling is expected to some degree and the building load is sufficiently distributed to avoid damaging results. In other contexts, such as wind turbine towers, substantial temporary loads may be imposed on the foundation. Unfortunately, conventional approaches to tower foundation monitoring involve complex and expensive sensor monitoring techniques, such as strain gauges and finely tuned movement detection. This type of analysis is often undertaken only after visible foundation compromise has been observed, by which time remedial measures may be ineffective. Still worse, catastrophic failure such as collapse is possible if early detection of subtle foundation movement remains unnoticed.

In the context of a wind turbine tower, the structure tends to be subjected to substantial loads from the rotation of blades attached to a rotor for driving a power generator. Although wind turbines exhibit an increased potential for foundation shifting, any fixed foundation or load bearing structure may benefit from monitoring of incremental (on the order of 1-10 mm) shifts due to settling, loads or cracking. In a foundation prone to periodic shift or movement between the foundation and a fixed base, the passive foundation shift detection device as described herein includes a biased displacement member, such that the biased displacement member has a force bias tending to dispose the displacement member against an interference member. The interference member is adapted to permit incremental displacement of the biased displacement member based on movement of the foundation relative to the fixed base. The biased member includes a spring or tension loaded linear or rotary member that is prevented from travel only by the interference member attached to the foundation being monitored. Upon a small shift or even a temporary deflection (as in a tower swayed by wind), the interference member is drawn out of interference, and allows the biased member to travel a visually detectable degree. The visually detectable degree is such that it is observable by a casual sight inspection, while the movement resulting in the shift (1-10 mm) may not be visually detectable. Alternate configurations include applications to monitor the excessive motion of heavy machinery, such as monitoring excessive motion between mechanical components (e.g. motion between a frame or mount and a gearbox or bearing.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of the foundation shift detection device in conjunction with a wind turbine tower. These towers are often built in close succession, lending themselves well to frequent but casual inspection from a "walk through" of a wind farm of multiple towers. Regarding terminology, a "foundation" may be defined as the lowest load-bearing part of a building, often below ground level. In the discussion herein, the foundation of the tower includes the bearing structure immediately under the tower (typically a concrete or reinforced concrete slab structure). The base refers to an adjacent, fixed mass to which movement relative to is measured. The base may be beside, or may extend beneath, the foundation. Generally, the foundation meets the base at a normal or substantially normal juncture, where a vertical foundation surface meets a horizontal base mass (typically both will be generally stationary concrete masses). The approach is applicability to other contexts where a vertical foundation surface to be evaluated for shifting/movement meets a stable, horizontal base surface against which relative movement is to be measured.

Figure 1:
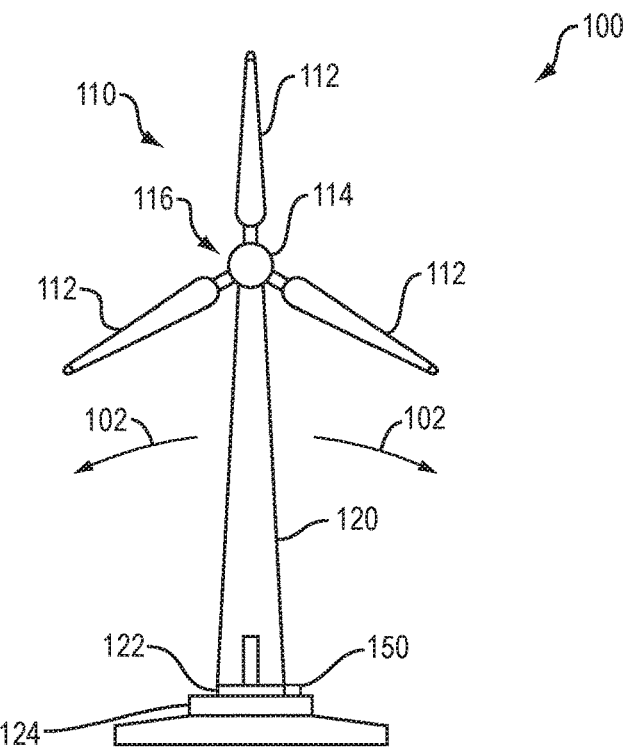
FIG. 1 is a wind turbine environment suitable for use with configurations herein.

FIG. 1 is a wind turbine environment 100 suitable for use with configurations herein. Referring to FIG. 1, a turbine 110 includes blades 112 attached to a rotor 114 that attaches to a generator and related mechanicals in a nacelle 116 that is rotatable to correspond to wind changes. The nacelle 116 pivots atop a tower 120 supported by a foundation 122 resting on a base 124. In a foundation 122 prone to periodic shift or movement between the foundation 122 and a fixed base 124, a passive foundation shift detection device 150 is placed in a perpendicular juncture between surfaces of the foundation 122 and the base 124. The base 124 may be any substantial mass adjacent and/or beneath the foundation.

The examples herein depict the foundation 122 of the tower 120 on the base 124. External forces, most notable wind, act on the tower 120 as shown by arrows 102. Foundation cracking, excessive tower motion, settlement of a tower, or tilt, are some common failure patterns of deteriorating onshore wind turbines. The dynamic forces combined with high fatigue loading subjected on an aging wind turbine could result in foundation failures and may impact the designed service life. The cyclic loading subjected on the wind-turbine foundation system could also lead to modulus degradation of the foundation system.

A particular anomaly with tower foundations is transient conditions that may cause the tower to resiliently sway or flex, resulting in a temporary shift between the foundation 122 and base 124, which retracts after the sway or flex movement subsides. Periodic measurements of the static structure will not reveal subtle periodic movements until much more substantial or catastrophic movement results. It would be beneficial to provide a device that passively measures any movement exceeding a threshold and retains the measured reading until subsequent inspection.

Figure 2:
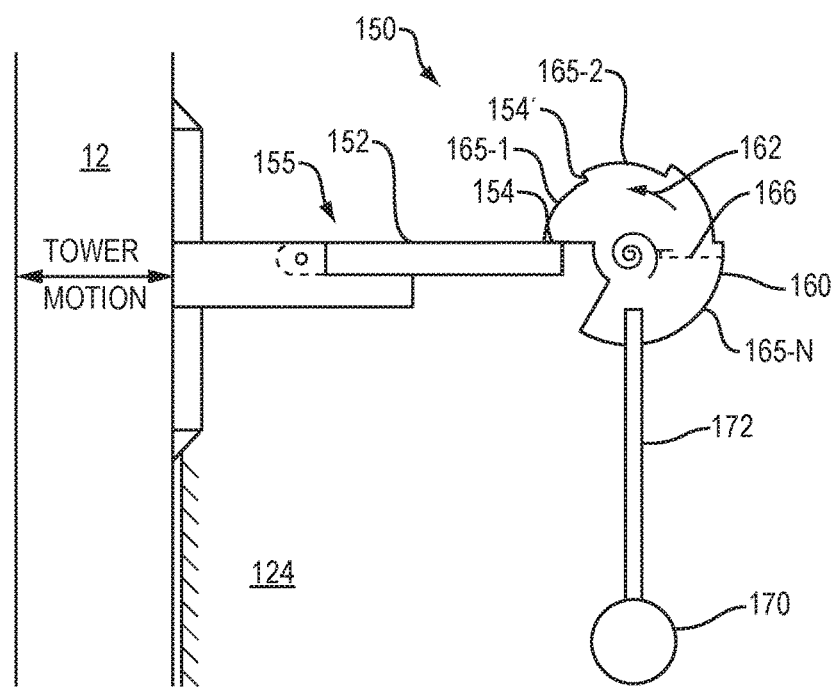
FIG. 2 is a schematic diagram of the disclosed approach in the environment of FIG. 1.

FIG. 2 is a schematic diagram of the disclosed approach in the environment of FIG. 1. Referring to FIGS. 1 and 2, a biased displacement member 160 (either rotary or linear), has a force bias shown by arrow 162 tending to dispose the displacement member 160 against an interference member 152. The interference member 152 is adapted to permit incremental displacement of the biased displacement member based on movement of the foundation relative to the fixed base 124. A distal portion of the interference member 152 defines an interference region 154, while a proximate end 155 is fixed to the foundation 122 to displace with the foundation 122. Upon foundation displacement, shown by arrow 161, of a magnitude greater than the width of the interference region 154, the displacement member 160 rotates in the biased direction 162.

The displacement member 160 (rotary indicator) has a cam shape responsive to rotational increments based on linear movement of the foundation 122 reflected by the interference member 152. The displacement member 160 has a plurality of radial sections 165-1 . . . 165-N (165 generally), and each radial section corresponds to an incrementally increasing radius portion of angular rotation of the displacement member 160. Each radial section 165 has a progressively increasing radius 166. The radii increase an increment from a previous radial extension based on a detection granularity of the foundation shift detection device. The displacement increment is typically between 1 mm and 2 mm, but may be any suitable increment.

The displacement member 160 continues rotation until an interference region 154' of the next radial increment corresponding to the successive radial section 165. A visual marker 170 is attached to the displacement member 160, such that the visual marker 170 is indicative of the movement based on an unmagnified visual inspection. The displacement of the displacement member 160 is greater than a movement of the interference member 152 that resulted in the displacement. Therefore, if the interference region 154 has a width of 2 mm, then advancement to the interference region 154' results from a foundation shift of 2 mm. At the same time, the visual indicator rotates by an angular degree equal to the radial section 165. In this manner, a barely measurable or visible foundation shift of 2 mm translates to a radial difference of an angular section 165, which is again translated to movement of visual indicator 170 magnified by the length of an indicator spoke 172. The visual marker 170 attached to the displacement member 160 is indicative of the movement based on an unmagnified visual inspection. In a wind farm of many turbine towers 120, a device 150 with visual indicators 170 adorned with bright colors and sufficient area, initialized to, say, extend horizontally, will result in a near upright positioning of the visual indicators 170 for towers experiencing a shift of 2 mm. An inspection involves merely walking along a row of towers 120 looking for visual indicators 170 pointing up instead of out.

Figure 3:
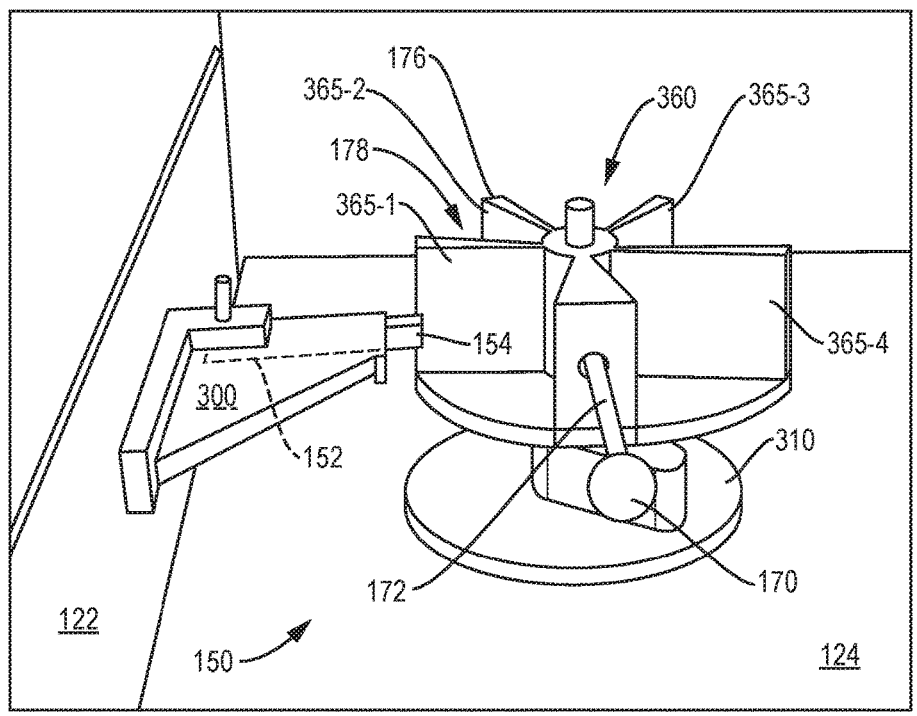
FIG. 3 is a perspective view of a foundation shift detection device as in FIG. 2.

FIG. 3 is a perspective view of a foundation shift detection device as in FIG. 2. Referring to FIGS. 2 and 3, in implementation of the foundation shift detection device 150, a fixed attachment to both the foundation and the base is employed. Further, the cam shape of FIG. 2 should avoid compression between the displacement member 160 and interference member, since if the interference member 152 just clears the displacement member on a transient shift, a return to a rest position may compress the interference member 152 in the advanced position of the displacement member 160.

The foundation shift detection device 150 shown in FIG. 3 includes a foundation portion 300 attached to the foundation 122 to be monitored, and a tower base portion 310 attached to the base 124 adjacent to the foundation 122. The displacement member 160 takes the form of a rotary indicator 360 attached to the tower base portion 310 and adapted for rotation responsive to displacement of the foundation 122 relative to the base 124.

Each radial section 165 defines a portion of angular rotation of the rotary indicator 360, similar to the cam shaped displacement member 160. However, each radial section 165 is defined by a hollow wedge 365-1 . . . 365-N (365 generally) having a rigid portion 176 for engaging the interference member and a void 178 defining a separation between a rigid portion of an adjacent hollow wedge 365. Each hollow wedge 365-N is therefore defined by the respective rigid portion 176 and void 178. Once the interference member 152 displaces sufficiently to allow advance of the rotary indicator 360 to the next hollow wedge 365, the interference member 152 passes through the void 178 and engages the next rigid portion 176. This avoids binding and compression of the interference member 122 in a close tolerance with a recently advanced displacement member 160.

Figure 4A:
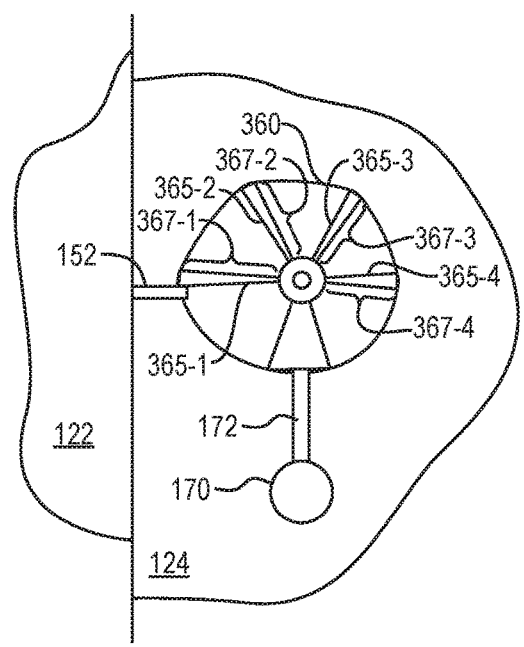
FIG. 4A is a plan view of the foundation detector of FIG. 3.
Figure 4B:
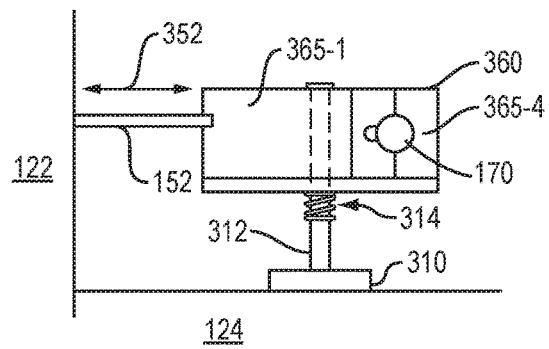
FIG. 4B is a side elevation of the foundation detector of FIG. 3.

FIG. 4A is a plan view of the foundation detector of FIG. 3, and FIG. 4B is a side elevation of the foundation detector of FIG. 3. Referring to FIGS. 3, 4A and 4B, the interference member 152 attaches to the foundation portion 300 and is in communication with the rotary indicator 360. A biasing spring 314 atop a shaft 312 provides rotational bias to the rotary indictor 360 so that constant pressure (bias) is exerted to advance the rigid portion 176 of each hollow wedge 365 past the interference member 152. Each rigid portion 176 has an incrementally greater radial extension 367-1 . . . 367-4 (367 generally), such that the length of the radial extension 367 causes engagement with the interference member 152 based on the displacement of the foundation 122.

Since the rotary indicator 360 has a rotational bias in the direction of increasing radial extensions 367, the rigid portion 176 is engaged in an interference with the interference member 152 for preventing biased rotation. Each rigid portion 176, however, is responsive to release upon foundation displacement drawing the interference member 152 out of interference with the rigid portion 176 for permitting rotation of the rotary indicator 360 into interference engagement of the rigid portion 176 of a successive radial extension 367-N+1.

Figure 5A:
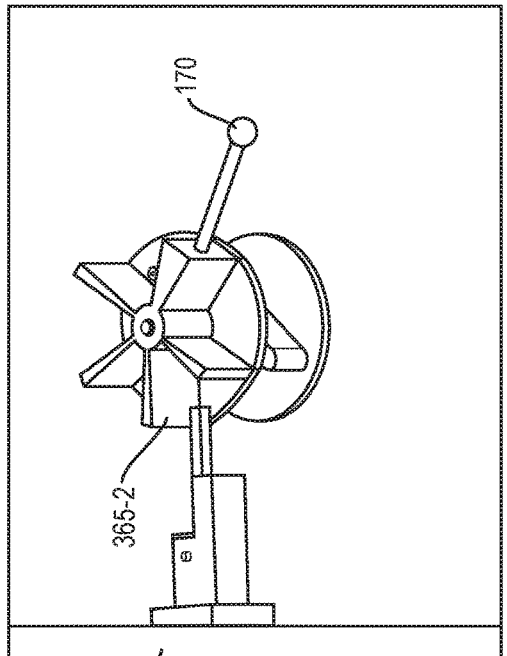
FIGS. 5A-5D show operation of the foundation detector responding to incremental foundation shifts.

FIGS. 5A-5D show operation of the foundation detector device 150 responding to incremental foundation shifts. Continuing to refer to FIGS. 4A and 4B, and to FIG. 5A-5D, a progression of rotation from hollow wedges 365-1 . . . 365-4 is shown. In FIG. 5A, the rigid portion 176 of wedge 365-1 is biased against the interference member 152, secured to the foundation 122 by a fixation assembly 153. The interference member 152 may be affixed to the foundation 122 by any suitable approach, such as adhesive, concrete anchors, magnetics, or other suitable attachment.

Figure 5B:
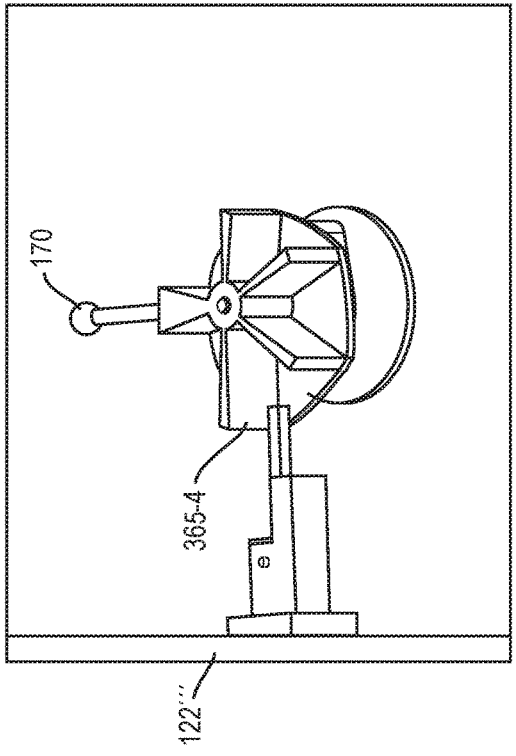

In FIG. 5B, the foundation shifts and retracts 2 mm to define foundation 122'. Accordingly, the interference member 152 is drawn back 2 mm and out of interference with hollow wedge 365-1. The bias advances the rotatory indicator until the rigid portion 176 of the next hollow wedge, 365-2, engages the interference member 152, since it has a radial extension 367-2 2 mm greater than radial extension 367-1. At the same time, visual indicator 170 is rotated to allow distant inspection (about 60 degrees). Since the rotary indicator 360 employs a radial "wedge" shape for each increment, rotation of the rotary indicator 360 advances an outermost point on the rigid portion 176 a greater distance than a movement of the interference member 152 that resulted in the rotation. In other words, a foundation 122 shift of 2 mm results in a 60° rotation of the rotary member 360, magnified by the radius at the outermost point of the rigid portion 176, and further enhanced by the length of the indicator spoke 172 and visual indicator 170.

Any suitable radial increment may be employed, but in practice an increment of one or 2 mm is expected. Approximately 4 hollow wedges on a rotary member therefore provide a range and granularity of 1, 2, 3, and 4 mm or 2, 4, 6 and 8 mm.

Figure 5C:
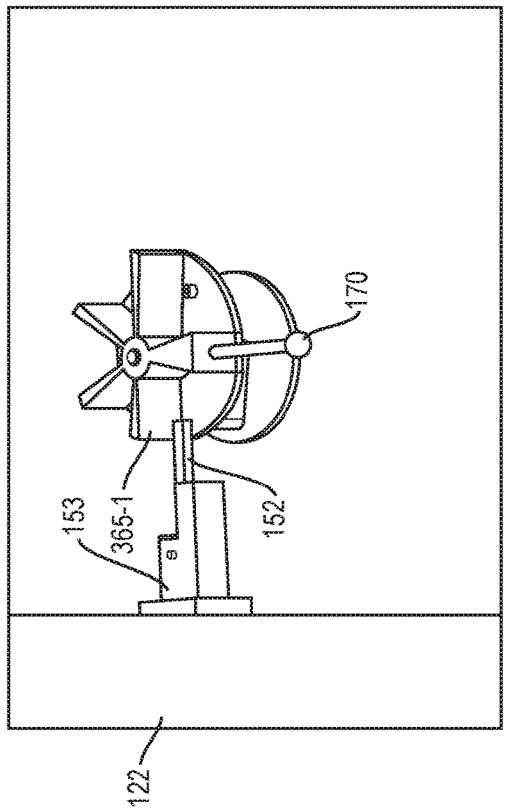
Figure 5D:
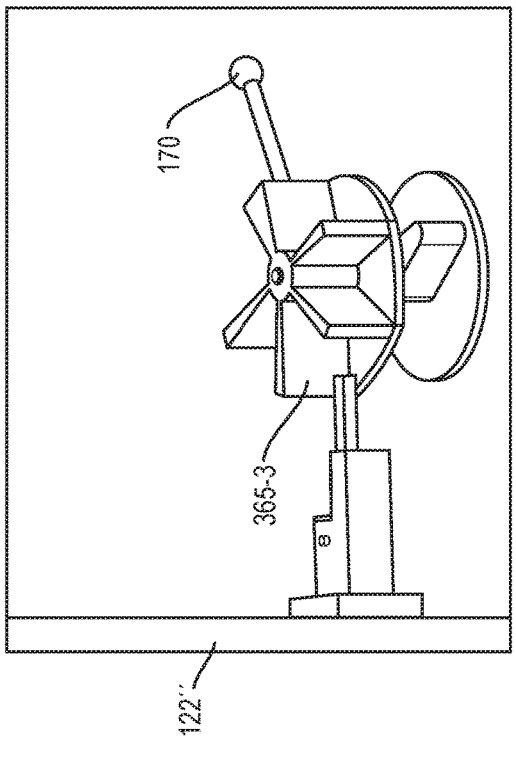

FIG. 5C defines a further foundation deflection of 4 mm by the foundation 122". Hollow wedge 365-3 advances, and visual indicator 170 advances another 60° increment. FIG. 5D depicts the full displacement range of 6 mm as hollow wedge 365-4 is rotated into interference at foundation 122'" position. The visual indicator 170 has now advanced a full half rotation (approximately) from the starting position exhibited with an unshifted foundation.

Additional rotary increments may of course be employed to increase the granularity and/or range of shift detection.

Figure 6:
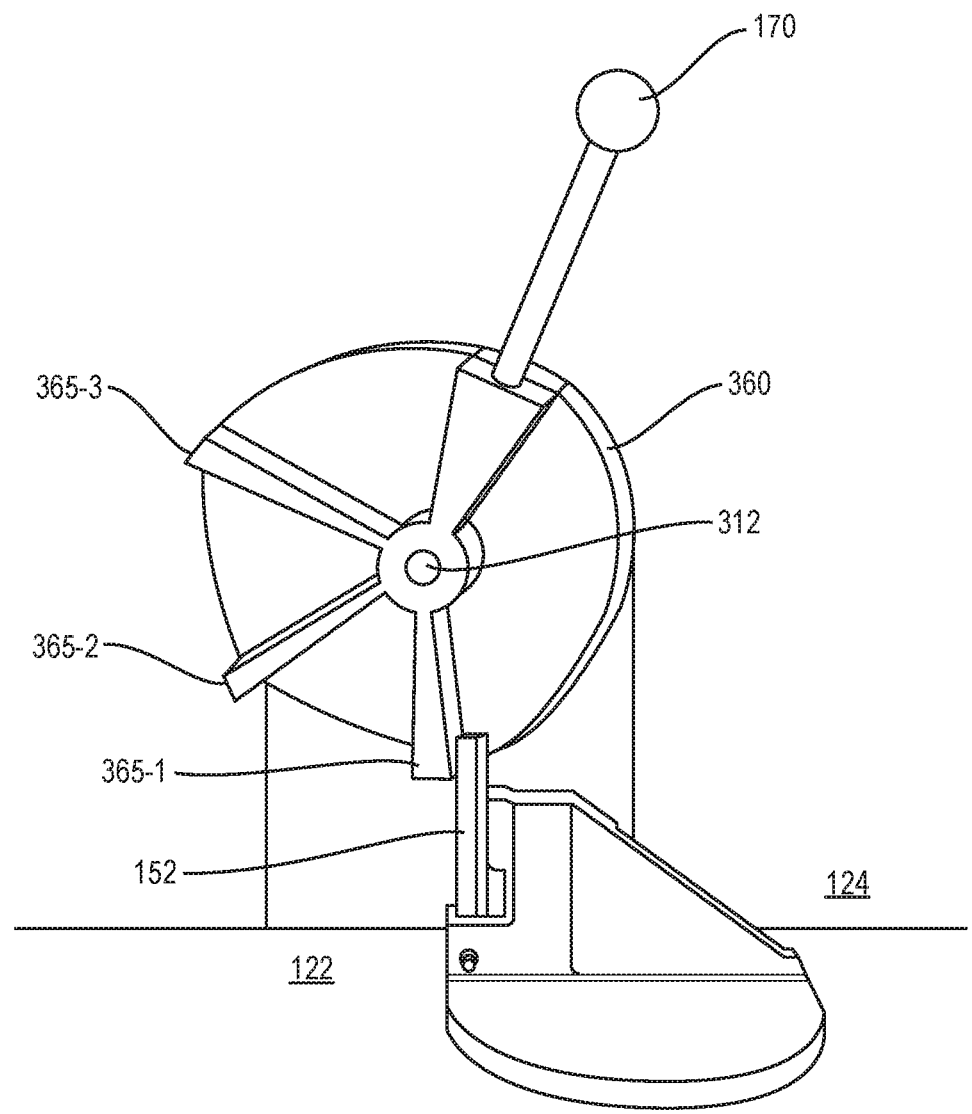
FIG. 6 is an alternate configuration adapted for a vertical component of movement.

FIG. 6 is an alternate configuration adapted for a vertical component of movement. Referring to FIG. 6, the rotary indicator 360 mounts on a horizontal shaft 312 and the interference member 152 has a vertical orientation. Other suitable orientations may be provided, disposing the rotary indicator 360 at an axis of rotation substantially perpendicular to the interference member 152 for accurate shift detection. In a further configuration, a single rotary indicator 360 may be employed for both horizontal and vertical foundation shift detection.

In a further configuration, the interference member 152 can be resisted by a set of wedges (365-1, 2, 3, and 4) having a rigid portion for engaging the interference member 152 that increase length as well as in width to provide an indication of motion in both the horizontal and vertical directions using a single cam indicator as the displacement member 160.

Various alternatives may be envisioned to implement the method for measuring periodic and temporary foundation shifting by disposing a foundation portion having an interference member 152 on a foundation to be monitored, and disposing a tower base portion on a base 124 adjacent the foundation 122 to be monitored, such that the tower base portion 124 is in communication with the foundation portion 122. The device 150 is configured for measuring a maximum relative movement of the foundation 122 relative to the base 124 by displacement of the displacement member 160. In the examples shown, this results in the rotary indicator 360, in interference with an interference member 152 attached to the foundation 122, is such that foundation movement drawing the interference member out of interference with the displacement member 160 allows incremental advance of the displacement member 160.

Visibility is enhanced to allow casual inspection because displacement of the displacement member is greater than a movement of the interference member that resulted in the displacement. Further, disposing a visual marker attached to the displacement member responsive to the movement of the tower base portion facilitates observation of the visual marker indicative of the movement based on an unmagnified visual inspection.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a foundation prone to periodic shift or movement between the foundation and a fixed base or foundation and tower, a passive foundation shift detection device, comprising:
   a biased displacement member, the biased displacement member having a force bias tending to dispose the displacement member against an interference member, the interference member adapted to permit incremental displacement of the biased displacement member based on movement of the foundation relative to the fixed base.

2. The device of claim 1 wherein the displacement member is disposed by a greater magnitude than a movement of the foundation that resulted in the displacement.

3. The device of claim 2 further comprising a visual marker attached to the displacement member, the visual marker indicative of the movement based on an unmagnified visual inspection.

4. A foundation shift detection device, comprising:
   a foundation portion attached to a foundation to be monitored;
   a tower base portion attached to a base adjacent to the foundation;
   a rotary indicator attached to the tower base portion and adapted for rotation responsive to displacement of the foundation relative to the base.

5. The device of claim 4 wherein the rotary indicator is a cam responsive to rotational increments based on linear movement of the foundation portion.

6. The device of claim 4 wherein the rotary indicator has a plurality of radial sections, each radial section corresponding to a an incrementally increasing diameter portion of angular rotation of the rotary indicator.

7. The device of claim 6 wherein each radial section defines a portion of angular rotation of the rotary indicator.

8. The device of claim 4 further comprising an interference member attached to the foundation portion and in communication with the rotary indicator.

9. The device of claim 8 wherein each radial section is defined by a hollow wedge, the hollow wedge having a rigid portion for engaging the interference member and a void defining a separation between a rigid portion of an adjacent hollow wedge.

10. The device of claim 9 wherein each rigid portion has an incrementally greater radial extension, the radial extension engaging the interference member based on the displacement of the foundation.

11. The device of claim 10 wherein the rotary indicator has a rotational bias in the direction of increasing radial extensions, the rigid portion engaged in an interference with the interference member for preventing biased rotation, each rigid portion responsive to release upon foundation displacement drawing the interference member out of interference with the rigid portion for permitting rotation of the rotary indicator and interference engagement of the rigid portion of a successive radial extension.

12. The device of claim 11 wherein each successive radial extension extends a displacement increment from a previous radial extension based on a detection granularity of the foundation shift detection device.

13. The device of claim 12 wherein the displacement increment is between 1 mm and 2 mm.

14. The device of claim 9 wherein the rotation of the rotary indicator advances an outermost point on the rigid portion a greater distance than a movement of the interference member that resulted in the rotation.

15. The device of claim 14 further comprising a visual marker attached to the rotary indicator, the visual marker indicative of the movement based on an unmagnified visual inspection.

16. The device of claim 9 wherein the interference member is adapted for resistance by a set of wedges having a rigid portion for engaging the interference member, the rigid portions having increasing length and width for providing an indication of motion in both the horizontal and vertical directions using a single can indicator.

17. The device of claim 1 wherein the foundation supports heavy machinery and the fixed base is an industrial structure.

18. A method for measuring periodic and temporary foundation shifting, comprising:
 disposing a foundation portion on a foundation to be monitored;
 disposing a tower base portion on a base adjacent the foundation to be monitored, the tower base portion in communication with the foundation portion; and
 measuring a maximum relative movement of the foundation relative to the base by displacement of a displacement member in interference with an interference member attached to the foundation, the foundation movement drawing the interference member out of interference with the displacement member for allowing incremental advance of the displacement member.

19. The method of claim 18 wherein the displacement of the displacement member is greater than a movement of the interference member that resulted in the displacement.

20. The method of claim 18 further comprising disposing a visual marker attached to the displacement member responsive to the movement of the tower base portion, the visual marker indicative of the movement based on an unmagnified visual inspection.

21. The method of claim 18 further comprising measuring foundation movement in one of either a horizontal or vertical direction.

* * * * *